US008885448B2

(12) United States Patent
Yang et al.

(10) Patent No.: US 8,885,448 B2
(45) Date of Patent: Nov. 11, 2014

(54) ENCAPSULATED LASER DIODE FOR HEAT-ASSISTED MAGNETIC RECORDING

(71) Applicant: Seagate Technology LLC, Cupertino, CA (US)

(72) Inventors: Seung-Yeul Yang, Eden Prairie, MN (US); Xiaoyue Huang, Eden Prairie, MN (US); Michael Christopher Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/788,860

(22) Filed: Mar. 7, 2013

(65) Prior Publication Data

US 2014/0254334 A1 Sep. 11, 2014

(51) Int. Cl.
G11B 11/00 (2006.01)
G11B 13/04 (2006.01)

(52) U.S. Cl.
CPC ................................... *G11B 13/04* (2013.01)
USPC .................. 369/13.33; 369/13.13; 369/13.32

(58) Field of Classification Search
CPC ................ G11B 2005/0021; G11B 2005/0032
USPC ........................ 369/13.33, 13.13, 13.32, 13.17
See application file for complete search history.

(56) References Cited

U.S. PATENT DOCUMENTS

| | | | | |
|---|---|---|---|---|
| 4,582,390 A * | 4/1986 | Furuya | ........................... | 385/131 |
| 4,969,712 A * | 11/1990 | Westwood et al. | ............. | 385/14 |
| 6,768,828 B2 * | 7/2004 | Gill et al. | ......................... | 385/14 |
| 8,105,956 B2 | 1/2012 | Ho et al. | | |
| 8,243,561 B2 | 8/2012 | Matsumoto | | |
| 8,310,903 B1 | 11/2012 | Takayama et al. | | |
| 8,391,107 B2 * | 3/2013 | Gage et al. | ................. | 369/13.33 |
| 2005/0162867 A1 | 7/2005 | Sinofsky | | |
| 2006/0126689 A1 | 6/2006 | Hong et al. | | |
| 2006/0193550 A1 | 8/2006 | Wawro et al. | | |
| 2008/0002298 A1 * | 1/2008 | Sluzewski | ................... | 360/234.4 |
| 2008/0316872 A1 * | 12/2008 | Shimizu et al. | ............. | 369/13.33 |
| 2009/0052077 A1 | 2/2009 | Tanaka et al. | | |
| 2010/0085998 A1 | 4/2010 | Igarashi | | |
| 2010/0214685 A1 | 8/2010 | Seigler et al. | | |
| 2011/0085425 A1 * | 4/2011 | Kitazawa et al. | .......... | 369/13.33 |
| 2011/0216635 A1 * | 9/2011 | Matsumoto | ................ | 369/13.33 |
| 2011/0228650 A1 * | 9/2011 | Shimazawa et al. | ....... | 369/13.33 |
| 2012/0044790 A1 * | 2/2012 | Shimazawa et al. | ....... | 369/13.33 |
| 2013/0279312 A1 * | 10/2013 | Hurley et al. | ............... | 369/13.33 |

OTHER PUBLICATIONS

Reznik et al., "Integration and characterization of spin on dielectric materials in image sensor devices", Prox. Of SPIE, vol. 7001, 2008, pp. 70010C1-70010C-9.
Trivedi et al., "Void-free filling of spin-on dielectric in 22 nm wide ultrahigh aspect ratio Si trenches", J. Vac. Sci. Technol., vol. B 27 (6), Nov./Dec. 2009, pp. 3145-3148.

* cited by examiner

*Primary Examiner* — Tan X Dinh
(74) *Attorney, Agent, or Firm* — Hollingsworth Davis, LLC

(57) ABSTRACT

A magnetic write head is disclosed that includes a slider that includes a laser diode having a light-emitting edge or surface of a laser diode and an optical waveguide. The disclosed magnetic write head also includes a dielectric layer disposed in a gap between the laser diode and an input to the optical waveguide. The dielectric layer fills the gap completely and provides a low-loss optical pathway for the laser diode to the input of the optical waveguide. Also disclosed is a method that includes spinning on a dielectric in a gap between the light-emitting surface and the optical waveguide coupler, wherein after the spinning on, the laser diode is optically coupled to the optical waveguide coupler through the dielectric.

23 Claims, 5 Drawing Sheets

ENCAPSULATED LASER DIODE FOR HEAT-ASSISTED MAGNETIC RECORDING

SUMMARY

Various embodiments disclosed herein are generally directed to methods, systems, and apparatuses that facilitate coupling a laser diode to a magnetic writer that includes a magnetic write head. In one aspect, a magnetic write head includes a slider that includes a laser diode having a light-emitting edge or surface. The disclosed write head also includes an optical waveguide and a dielectric layer disposed in a gap between the optical waveguide and the light-emitting edge or surface. The dielectric layer is configured to optically couple the laser diode to the optical waveguide. The dielectric has a refractive index greater than 1.60. In some embodiments, the slider can have a laser-in-slider configuration.

In another aspect, a method is disclosed that includes attaching a laser diode to a magnetic write head. The laser is oriented so that a light-emitting edge or surface of the laser diode faces an optical waveguide coupler. The method further includes spinning on a dielectric in a gap between the light-emitting surface and the optical waveguide coupler, wherein after the spinning on, the laser diode is optically coupled to the optical waveguide coupler through the dielectric.

The above summary is not intended to describe each disclosed embodiment or every implementation of the present disclosure. The Figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another Figure labeled with the same number.

DETAILED DESCRIPTION

Figure 1:
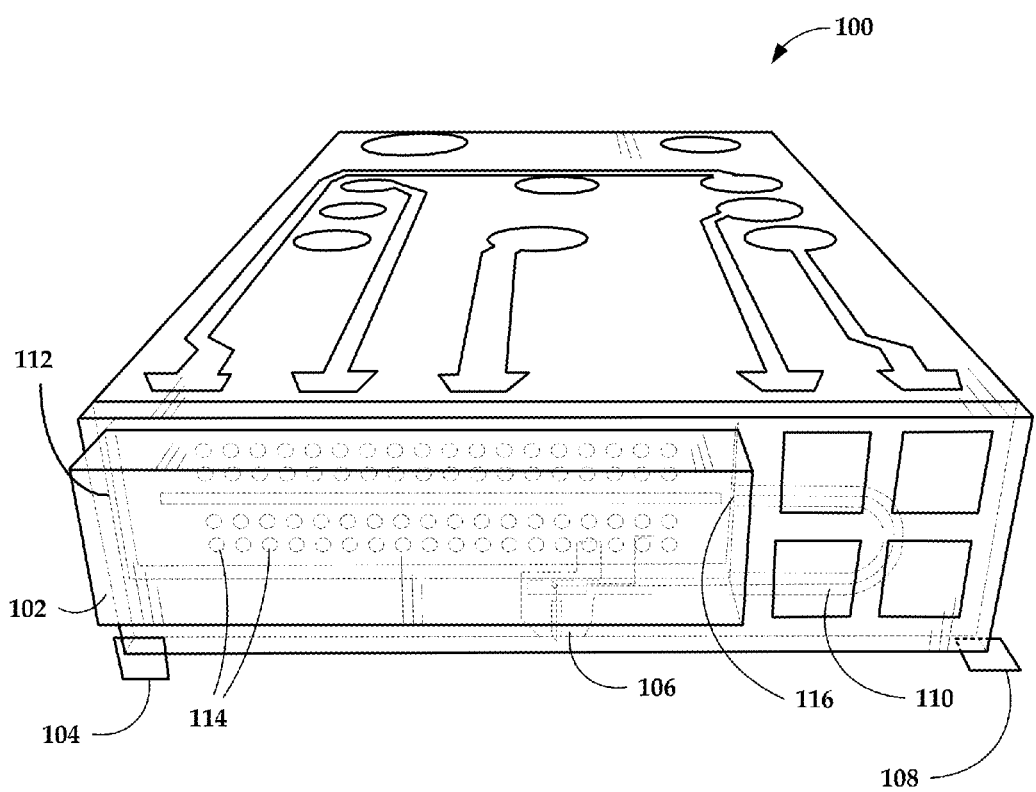
FIG. 1 is a perspective view illustrating various features of a laser-in-slider (LiS) device.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

One way to achieve a tiny confined hot spot is to use an optical near-field transducer (NFT), such as a plasmonic optical antenna or an aperture, located near an air bearing surface of a hard drive slider. Light may be launched from a light source (e.g., a laser diode) into optics integrated into a slider. An example of such integrated optics includes a waveguide formed from core and cladding layers with high contrast between respective refractive indices. Light propagating in the waveguide may be directed to an optical focusing element, such as a planar solid immersion mirror (PSIM). The PSIM may which may concentrate the energy into a NFT. The NFT causes the energy to be delivered to the media in a very small spot.

A waveguide, NFT, and PSIM are examples of integrated optical devices that are formed within the slider. The field of integrated optics generally relates to the construction of optics devices on substrates, sometimes in combination with electronic components, to produce functional systems or subsystems. For example, light may be transferred between components via waveguides that are built up on a substrate using layer deposition techniques. These waveguides may be formed as a layer of materials, with a middle core layer having a relatively high refractive index, and top/bottom cladding layers of relatively low refractive index. Other optical components may be formed in similar fashion, including the NFT and PSIM discussed above.

In a HAMR slider, light is launched into these integrated optics components from a light source such as a laser diode. One way to launch light into a slider is from an externally mounted laser via an optical waveguide or grating coupler fabricated in a slider. Another way is to place a laser light source, such as a laser diode, into the slider, called laser-in-slider (LiS) light delivery. In laser-in-slider configurations, light is launched from the emitting facet of a laser diode into an optical waveguide. Laser-in-slider light delivery can be integrated at a wafer level and may be suitable for mass production.

Even though laser-in-slider light delivery may be a prime candidate for mass production, there are many challenges in producing such devices. For example, while many small-scale electromagnetic and mechanical features can be formed using techniques developed and refined over the years for forming highly complex electronics (e.g., processors), a HAMR device must also integrate optical devices into these assemblies. Further, a separately formed laser diode may need to be assembled to the slider, required alignment tolerances on the order of tenths of a micrometer. Additionally, there can be light loss in laser-in-slider light delivery due to contamination and light loss due to refractive index mismatch reflections and interference (Fabry-Perot effect).

One way to overcome the problems of alignment, contamination, and light loss is to fill the gap between the laser diode having a light-emitting edge or surface and the optical waveguide. The present disclosure provides for optical grade, void-free encapsulation materials to fill in the high aspect ratio gap between the laser diode output facet and the input optical waveguide. These encapsulation materials are, typically, high refractive index dielectric materials. The use of high refractive index dielectric encapsulants can provide an optical path with good uniformity, low optical loss, minimum stress, minimum Fabry-Perot effect, and can be done easily in mass production. In particular it has been found that spin-on-dielectics (SOD) and vapor deposited dielectrics (i.e., by vapor deposition) can provide encapsulation materials that fill the gap effectively.

Vapor deposition techniques, such as evaporation, sputtering, plasma-enhanced chemical vapor deposition, and high-density plasma vapor deposition can be used to encapsulate the gap between the emitting facet of the laser diode and the optical input of the waveguide. Vapor deposition techniques can also be used for void-free gap filling. To avoid Fabry-Perot effects the index of refraction of the deposited encapsulant material should be close to the refractive index of the waveguide which is about 1.7. Highly conformal optical grade dielectrics that can be deposited by vapor deposition include metal oxides such as, for example, $Al_2O_3$, $Y_2O_3$ $HfO_2$ MgO, $SiO_2$, and $SiO_xN_y$, ($0<x<2$; $0<y<4/3$) in the format of single layers or multiple layers of alternating high index and low index.

Another way to provide void-free, seamless, encapsulation is by using spin-on dielectrics (SODs). SOD processes have also been widely employed in semiconductor chip fabrication in broad applications due to their unique advantages over other vacuum deposition processes. They can be done at ambient pressure ambient temperatures, for example at room temperature, in some cases. Spin-on dielectrics utilize spin coating of dielectric solutions or dispersions. In flat, wafer-fabrication systems they can provide a way to deposit thin layers of dielectrics without the need for high temperatures or vacuum. As disclosed herein, spin-on dielectrics can provide a way to deposit a dielectric material into the gap between the laser diode and the optical input of the waveguide in heat-assisted magnetic recording write heads. Spin coating involves applying an excess amount of a liquid coating solutions or dispersions on a substrate and rotating the substrate at speeds high enough to remove excess material and disperse the remaining material into a thin and uniform coating.

The coatings may be spun-on to the wafer substrate of a laser-in-slider assembly, including the gap, using variable speeds of between about 1000 and 3000 rotations per minute (rpm) on a spin coater. In addition, dielectrics may require a series of process steps including pre-baking, then thermal curing or UV curing as well as an annealing cycle done by furnace curing or hot plate curing. Exemplary films were made by using thermally curable silicate spin-on dielectric solutions NEOCERAMIC A-119 or NEOCERAMIC A-138 and NEOCERAMIC FA-150, a UV curable acrylate spin-on coating, available from U.P. Chemical Co., Ltd., Korea. After spin coating the dielectric pre-baking may be done at temperatures ranging from about 60° C. for the NEOCERAMIC FA-150 (5 minutes-10 minutes) and to about 150° C. for the NEOCERAMIC AC-119 (3 minutes). After spin-coating and pre-baking, the wafer substrate with the NEOCERAMIC FA-150 was cured by exposure to actinic radiation with a level of power from about 200 mW to about 400 mW for exposure times of about 1 minute. The thermally curable spin-on-dielectric solutions were cured at 150° C. for 4 hours. They were annealed as shown in Table 1. Table 1 shows processing conditions for two exemplary spin-on dielectric solutions.

TABLE 1

Processing Conditions for Exemplary Spin-on-dielectrics
Example Process Steps for SOD

| Spin-on Dielectric | NEOCERAMIC AC-119 | NEOCERAMIC FA-150 |
|---|---|---|
| Composition | SiO2 | Acrylate |
| % solids | 19% | 50% |
| Spin Coating Conditions | 1250 rpm | 3000 rpm |
| Pre-Baking (hot plate) | 150° C. for 3 min | 60° C. for 5 min |
| Curing | Thermal | Ultra Violet (UV) |
| Annealing | Furnace annealing for 1-2 hours | No thermal annealing |

Spin-on dielectrics can include inorganic and organic solutions or dispersions. Inorganic spin-on dielectrics include spin on glasses (silicates, siloxanes, silsesquioxanes), doped glasses, and suspended nanoparticles. Organic spin-on dielectrics include polymers that can have dielectric properties and can include polyimides, benzocyclobutene, polyphenylquinoxalines, polysilazanes, fluoropolymers, and highly aromatic polymers. Any polymers with high transmission in the wavelength region of the laser diode, high chemical resistance, and high index of refraction to match or come close to the refractive index of the optical waveguide and can be dissolved or dispersed in a solvent for spin coating can be used as spin-on dielectrics. Polymers with a high index of refraction (typically an index of refraction above 1.55, or above 1.60, or even above 1.65) tend to comprise polar groups, such as aromatic rings. Fluorene-based acrylate polymers possess good optical properties (refractive index of about 1.63), have high optical transmittance (greater than about 90% over the visible wavelength), excellent chemical resistance, and good thermal stability at 100° C.

Fluorene-based acrylate polymers (acrylic polymers containing a fluorene moiety (Structure (I); at least one of $R^1$ or $R^2$ is an acrylate group, the other is H if both are not acrylates) include bisaryl fluorene acrylates such as, for example, that available from Osaka Gas Chemicals, Osaka, JAPAN under the product name OGSOL EA-0200 or fluorene-based acrylates available from S.M.S. Chemicals Co., Ltd, Taipei City, Taiwan. Other optically-clear, high index polymers can also be used as long as they do not chemically degrade the laser diode or the components of the optical waveguide, for example, NEOCERAMIC AC-170 or NEOCERAMIC FA-150 available from UP Chemical Co., Ltd. Korea.

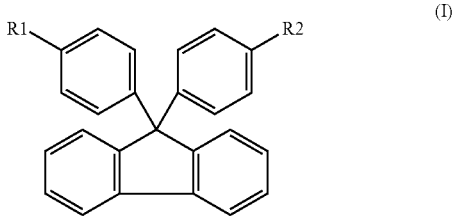

(I)

In reference now to FIG. 1, a perspective view illustrates various features of laser-in-slider device 100 according to an example embodiment. In this example, edge-emitting laser diode 102 is integrated into trailing edge surface 104 of slider 100. Laser diode 102 is proximate to HAMR read/write head 106, which has one edge on air bearing surface 108 of slider 100. Air bearing surface 108 is held proximate to a moving media surface (not shown) during device operation. Laser diode 102 provides electromagnetic energy to heat the media surface at a point near read/write head 106. Optical coupling components, such as waveguide 110, are formed integrally within slider device 100 to deliver light from laser 102 to the media.

In this example, laser diode 102 is approximately 500 μm long, 125 μm wide (vertical dimension in the orientation of FIG. 1), and 100 μm tall. Laser diode 102 is recessed in cavity 112 formed in trailing surface 104 of slider 100. Cavity 112 may be formed such that there is a gap (e.g., approximately 5 μm-10 μm in width) surrounding laser 102 diode to allow for tolerance adjustment during assembly. The bottom of cavity 112 includes solder bumps 114 that interface with corresponding bumps/pads formed on laser diode 102. Solder bumps 114 facilitate bonding laser diode 102 to slider 100, and provide electrical connectivity for laser diode 102. Solder bumps 114 may also provide other functions including alignment and heat sinking of laser diode 102.

During assembly, laser diode 102 is precisely aligned with optical waveguide 110 to ensure sufficient energy is delivered to the media. At an optical coupling region, laser diode 102 includes an output facet that is aligned to launch light into input optical coupler 116 of optical waveguide 110. Input optical coupler 116 may be formed from edge of waveguide 110 in a sidewall of the cavity 112. In one embodiment, cavity 112 may include a narrow gap between input optical coupler 116 and the output facet of the laser 102 to facilitate alignment therebetween. The gap can be from about 0.25 μm to about 10 μm across, from about 0.5 μm to about 2.5 μm across, or from about 0.25 μm to about 1.0 μm across and, typically about 5 to 6 times that distance in depth. In some embodiments, the narrow gap can have an aspect ratio of between 5 and 6 (ratio between the longest dimension and shortest dimension).

Figure 2:
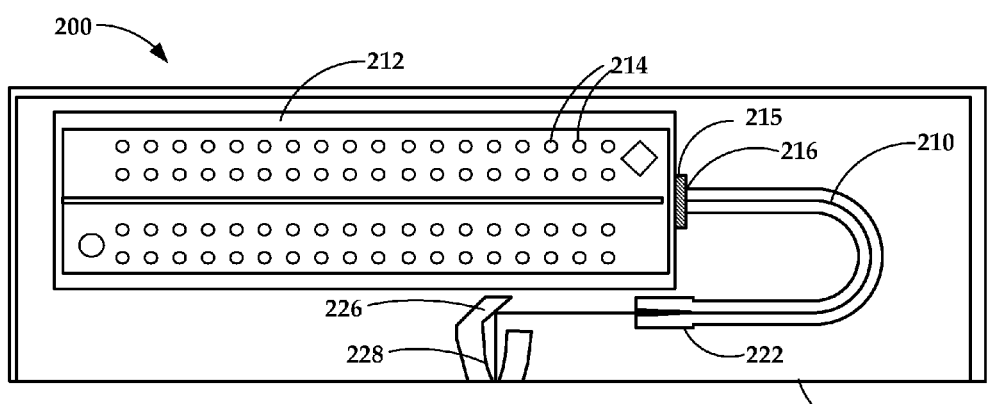
FIG. 2 is a more detailed front view of the LiS shown in FIG. 1.

An example embodiment showing a more detailed front view of a trailing edge of slider assembly 200 is shown in FIG. 2. FIG. 2 is a front view showing electrical and optical interface features of slider assembly 200 that mate with an edge-emitting laser diode (e.g., laser diode 102 in FIG. 1). Cavity 212, solder bumps 214, waveguide input 216, waveguide 210, and air bearing surface 208 seen here, were previously illustrated in FIG. 1. Solder bumps 214 on slider assembly 200 are configured to interface with the plurality of solder pads on the lower surface of a laser diode. The laser diode may include an output facet on one end that launches light into input 216 of waveguide 210 for delivery to the recording media. Integrated optics associated with light delivery may include coupling elements, beam expanders 222, collimators, focusing elements 226, such as PSIM, concentrating elements, 228 such as an optical near-field transducer. Furthermore, located at the edge of cavity 212 between the laser diode and waveguide input 216 is gap 215. The size of gap 215 may depend on the alignment of the laser diode to cavity 212, but a typical size may be from about 0.25-1.0 μm and up to about 10 μm. Gap 215 may also have an aspect ratio of about 5 to 6. The aspect ratio is the ratio between depth of cavity 212 and the width of cavity 212.

Figure 3:
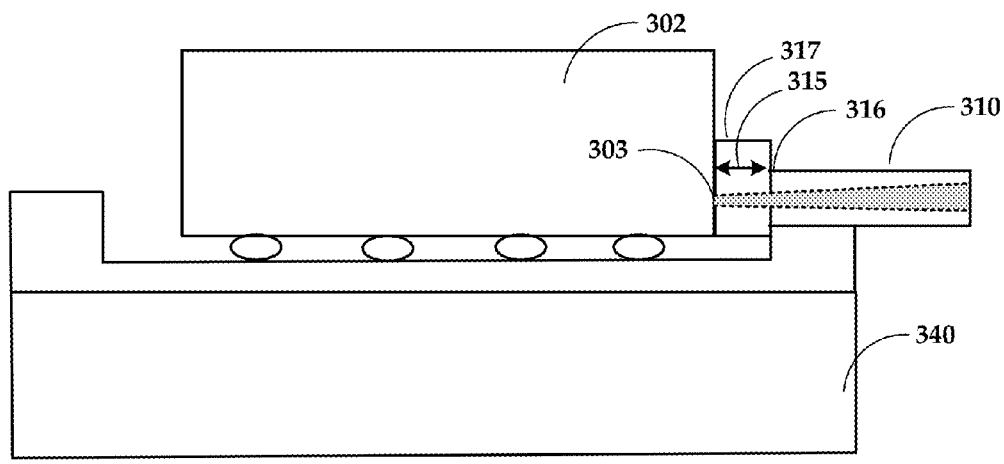
FIG. 3 is an illustration of an embodiment of the present disclosure showing a dielectric in the gap between the laser diode and waveguide coupler.

Shown in FIG. 3 is a top view of a slider 340 assembly that includes laser diode 302 filled gap 315. FIG. 3 includes laser diode 302 having output facet 303 that includes a light-emitting edge or a light-emitting surface, optical waveguide 310 having input optical coupling end 316, and dielectric 317 disposed in the gap between optical waveguide 310 and laser diode output facet 303. Dielectric 317 used to fill gap 315 is configured to optically couple laser diode 302 to optical waveguide 310. Dielectric 317 may have an index of refraction greater than 1.6 as well as an average transmission of about 90% or greater at wavelengths emitted by laser diode 302. Dielectric 317 may have an index of refraction of about 1.7 to match the input waveguide coupler. Moreover, dielectric 317 may be disposed in gap 315 through a variety of means including vacuum thin-film deposition and SOD as discussed above.

Figure 4A:
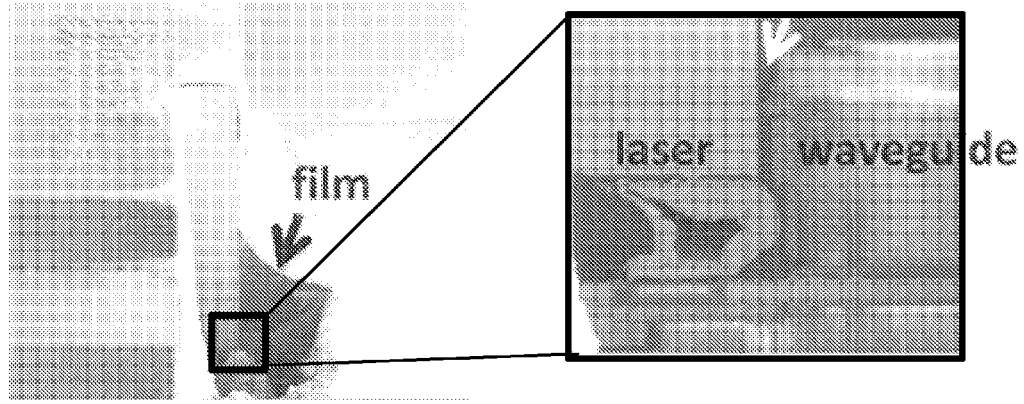
FIG. 4a is a cross-sectional scanning electron microscope image of an exemplary laser-in-slider cavity after spin-on-dielectric coating.

FIG. 4a is a scanning electron microscope (SEM) image of a cross-section of an exemplary laser-in-slider cavity after application of a spin-on-dielectric coating. The sample was prepared by spinning on a raw chemical polymer solution (NEOCERAMIC FA-150) with a refractive index of 1.63. The spin speed was varied between about 1000 rpm and about 3000 rpm for about 1 minute to optimize the film thickness profile on the sides and below the laser diode. The film was then thermally prebaked at 60° C. for 10 minutes followed by ultraviolet (UV) curing for 1 minute at a power of 200-400 mW/cm². The SEM images of FIG. 4A show excellent gap filling with a dense, void-free film between the laser diode facet and the input of the optical waveguide.

Figure 4B:
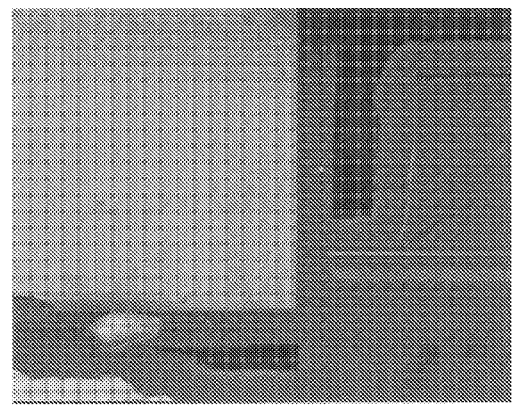
FIG. 4b is a cross-sectional scanning electron microscope image of a comparative laser-in-slider cavity after an atomic layer deposition coating.

Similarly, FIG. 4b shows cross section SEM images of a comparative laser-in-slider cavity after an atomic layer deposition (ALD) coating with $Al_2O_3$. The example provided shows how the application of $Al_2O_3$ through atomic layer deposition can be used for seamless gap filling between the laser diode and the input of the optical waveguide. Atomic layer deposition has a low throughput, about 140 Å/min and requires a long process time to fill in the approximately 2 μm gap between a laser diode facet and the input coupler of the waveguide.

The atomic layer deposition process for the example illustrated in FIG. 4b took 143 minutes for a 2 μm deposition, while the complete spin-on-dielectric deposition process (e.g., spin coat, prebake, UV cure) took approximately 12 minutes. Both processes provided a void-free encapsulation film between the emitting facet of the laser diode and the input of the optical waveguide.

Figure 5:
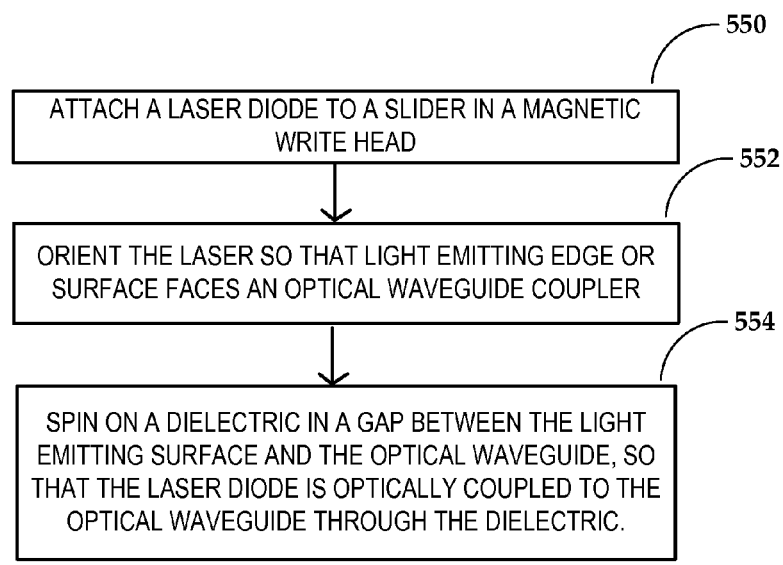
FIG. 5 is a flow diagram illustrating the assembly of a laser-in-slider device according to an embodiment described herein.

FIG. 5 is a flow diagram illustrating the assembly of a laser-in-slider device according to an example embodiment. Step 550 includes attaching a laser diode to a magnetic write head and orienting 552 the laser such that the light-emitting edge, or surface, faces an optical waveguide coupler. Lastly, in step 554, spinning on a dielectric into the gap between the light-emitting surface and the optical waveguide, so that the laser diode is optically coupled to the optical waveguide through the dielectric. Thereby enabling light delivery from the laser diode to the optically coupled waveguide optics All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A magnetic write head, comprising:
a slider that includes a laser diode having a light-emitting edge or surface;
an optical waveguide; and
a spin-on-dielectric disposed in a gap between the optical waveguide and the light-emitting edge or surface, the dielectric configured to optically couple the laser diode to the optical waveguide,
wherein the dielectric has a refractive index greater than about 1.6.

2. A magnetic write head according to claim 1, wherein the slider has a laser-in-slider configuration.

3. A magnetic write head according to claim 1, wherein the dielectric comprises a metal oxide.

4. A magnetic write head according to claim 3, wherein the metal oxide comprises, aluminum, yttrium, hafnium, magnesium, or silicon.

5. A magnetic write head according to claim 1, wherein the spin-on-dielectric comprises an organic polymer.

6. A magnetic write head according to claim 5, wherein the organic polymer is curable by exposure to actinic radiation.

7. A magnetic write head according to claim 5, wherein the organic polymer comprises a fluorene moiety.

8. A magnetic write head according to claim 1, wherein the gap ranges from between about 0.5 μm and about 2.5 μm.

9. A magnetic write head according to claim 1, wherein the gap has a ratio of 5-6 between a longest dimension of the gap and a shortest dimension of the gap.

10. A magnetic write head according to claim 1, wherein the dielectric has an average transmission of about 90% or greater at wavelengths emitted by the laser diode.

11. A method, comprising:
attaching a slider comprising a laser diode to a magnetic write head, the laser oriented so that a light-emitting edge or surface of the laser diode faces an optical waveguide coupler; and
spinning on a dielectric in a gap between the light-emitting surface and the optical waveguide coupler, wherein after the spinning on, the laser diode is optically coupled to the optical waveguide coupler through the dielectric.

12. A method according to claim 11, wherein the gap ranges from between about 0.5 μm and about 2.5 μm.

13. A method according to claim 11, wherein the gap has a ratio of 5-6 between a longest dimension of the gap and a shortest dimension of the gap.

14. A method according to claim 11, wherein the dielectric has a refractive index greater than about 1.6.

15. A method according to claim 11, wherein the dielectric comprises a spin-on dielectric.

16. A method according to claim 15, wherein the dielectric comprises an organic polymer.

17. A method according to claim 16, wherein the organic polymer is curable by exposure to actinic radiation.

18. A method according to claim 16, wherein the organic polymer comprises a fluorene moiety.

19. A method according to claim 11, wherein the dielectric has an average transmission of about 90% or greater at wavelengths emitted by the laser diode.

20. A method according to claim 10, wherein spinning on the dielectric comprises spinning on the dielectric at a variable speed between about 1000 and 3000 rpm for 10 minutes.

21. A method according to claim 10, further comprising pre-baking the magnetic write head at a temperature of about 60° C. for 10 minutes prior to the spinning on.

22. A method according to claim 10, further comprising curing the dielectric after the spinning on.

23. A method according to claim 21, wherein curing the dielectric comprises exposing the dielectric to ultraviolet light with a level of power of 200-400 mW/cm$^2$ for a period of 1 minute.

* * * * *